UNITED STATES PATENT OFFICE.

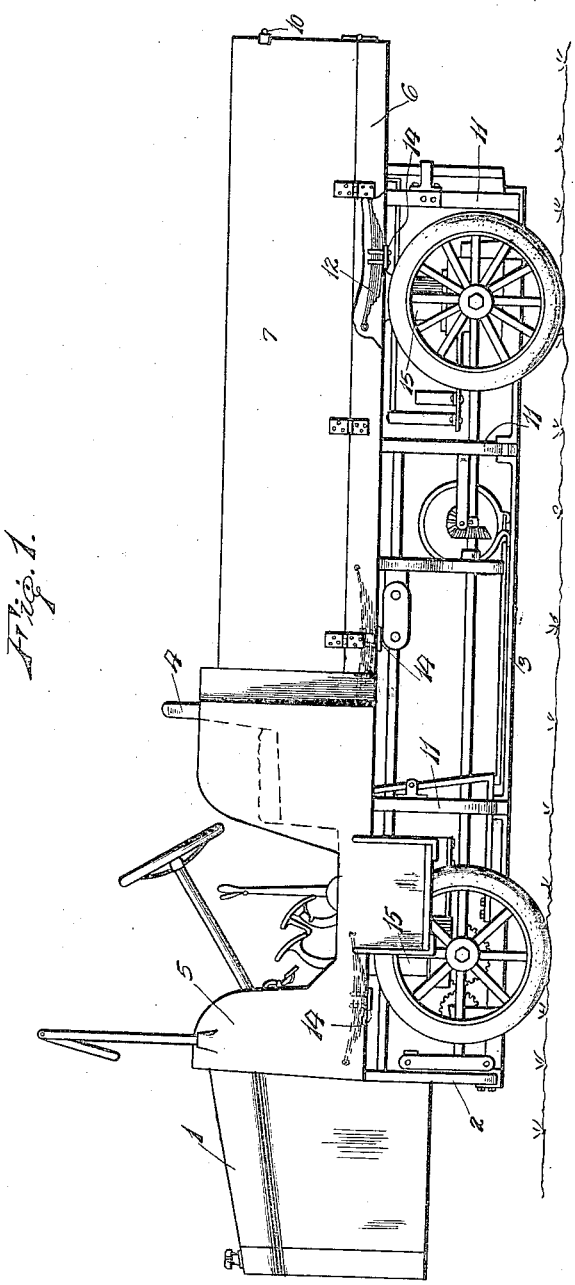

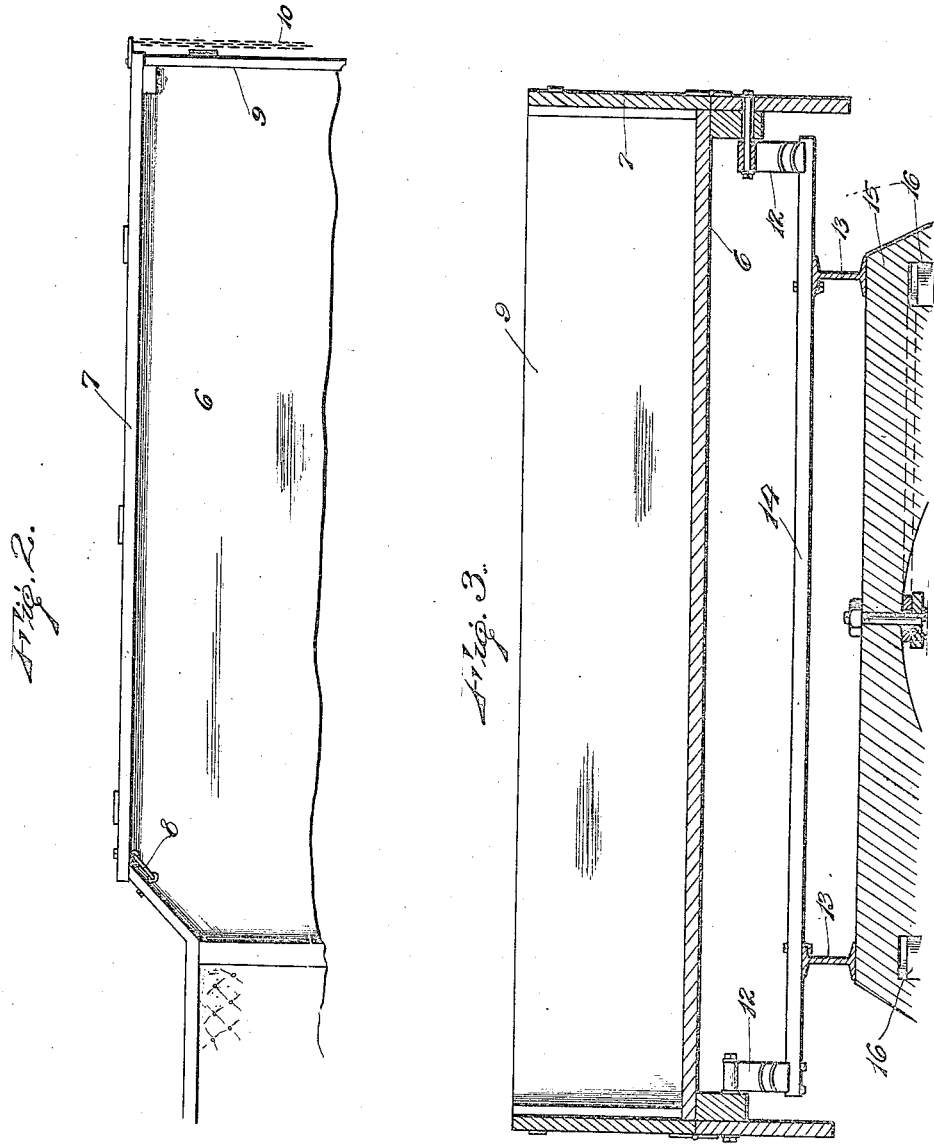

WILBERT F. KINCAID, OF GAULEY BRIDGE, WEST VIRGINIA, ASSIGNOR OF ONE-HALF TO ALBERT H. MASON, OF GAULEY BRIDGE, WEST VIRGINIA.

AUTOMOBILE BODY.

1,421,788. Specification of Letters Patent. Patented July 4, 1922.

Original application filed September 3, 1920, Serial No. 407,919. Divided and this application filed April 9, 1921. Serial No. 460,012.

*To all whom it may concern:*

Be it known that I, WILBERT F. KINCAID, a citizen of the United States, residing at Gauley Bridge, in the county of Fayette and State of West Virginia, have invented certain new and useful Improvements in Automobile Bodies, of which the following is a specification.

This application is a division of an application filed by me September 3, 1920, Serial No. 407,919, the object of the present invention being to provide an arrangement which will permit the body of a motor truck to be changed at will.

In the accompanying drawings—

Figure 1 is a side elevation of a motor truck embodying the invention;

Fig. 2 is a plan view of a portion of the body;

Fig. 3 is an enlarged transverse section.

In the drawings, the reference numeral 1 indicates a hood of any preferred form enclosing the engines and the means for controlling the same, the said hood and the frame of the same being so constructed as to provide a hanger 2 which forms a support for the main longitudinal beam 3 of the chassis. The vehicle body comprises an intermediate portion including the seat 4 and the dash 5, while the rear portion of the body comprises a platform 6 and sides 7 hinged to the side edges of the platform and normally held in raised position by hooks or other fastenings, indicated at 8, connecting them to the rear ends of the intermediate portion of the body. An end gate 9 is provided between the rear ends of the sides 7 and is normally held in its closed position by a chain or other fastening 10 as will be readily understood. While I have shown and thus specifically described a truck body for hauling commodities, it will be understood that the invention may be applied to pleasure cars without any departure from the principles thereof. The main longitudinal beam 3 of the chassis extends the full length thereof and transverse beams or plates 11 are erected thereon at intervals to furnish supports for sills 13 and transverse bars 14 which carry longitudinally extending springs 12 removably attached at their ends to the platform by bolts inserted horizontally through the depending side members of the platform and the end eyes of the springs.

Arches or bolsters 15 are constructed at their ends to rotatably receive vertical spindles 16 which carry the ground wheels and means are provided to apply power to the wheels and adjust them angularly for steering.

Having thus described the invention, what is claimed as new is:

In an automobile, the combination of a chassis including transverse bolsters, longitudinal sills secured rigidly on said bolsters at the ends thereof, transverse bars secured rigidly on said sills, longitudinally extending springs mounted on the ends of said transverse bars, a body including a platform extending over the bolsters or sills and the transverse bars, and detachable fastenings inserted through the depending side members of the platform and the end eyes of the springs.

In testimony whereof I affix my signature.

WILBERT F. KINCAID. [L. S.]